(12) United States Patent
Cho et al.

(10) Patent No.: US 7,042,827 B2
(45) Date of Patent: May 9, 2006

(54) DISK DRIVE SERVO SYSTEM FOR ECCENTRICITY COMPENSATION AND METHOD THEREOF

(75) Inventors: Seong-il Cho, Seoul (KR); Joong-eon Seo, Gyeonggi-do (KR); Soo-yul Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 679 days.

(21) Appl. No.: 10/175,151

(22) Filed: Jun. 20, 2002

(65) Prior Publication Data

US 2003/0016607 A1    Jan. 23, 2003

(30) Foreign Application Priority Data

Jun. 20, 2001    (KR) ............................. 2001-35106

(51) Int. Cl.
*G11B 7/00* (2006.01)
(52) U.S. Cl. .................. 369/124.1; 369/124.13; 369/124.01; 369/44.34
(58) Field of Classification Search ............... 369/47.1, 369/47.15, 47.18, 47.25, 47.35, 53.1, 59.1, 369/59.13, 59.2, 59.21, 59.22, 124.01, 124.1, 369/44.27, 44.28, 44.29, 44.32, 44.34, 44.35; 360/75, 77.04, 78.09
See application file for complete search history.

(56) References Cited

U.S. PATENT DOCUMENTS

| 5,550,685 A | * | 8/1996 | Drouin ................. 360/77.08 |
| 5,892,742 A | | 4/1999 | Yamashita et al. |
| 6,417,983 B1 | * | 7/2002 | Yatsu .................. 360/77.04 |

FOREIGN PATENT DOCUMENTS

JP    2000-339729    12/2000

* cited by examiner

*Primary Examiner*—Muhammad Edun
(74) *Attorney, Agent, or Firm*—Stein, McEwen & Bui, LLP

(57) ABSTRACT

A disk drive servo system for eccentricity compensation and a method thereof includes an error detector detecting a position error between an actual position and a predetermined nominal reference position of a turntable actuator, a feedback unit generating and outputting a first control value to compensate for the position error received from the error detector, a learning controller calculating, storing, and outputting a second control value to compensate for eccentricity at one or more predetermined speeds of the disk drive, and a gain/phase adjustor providing gain and phase compensation information corresponding to the second control value of the learning controller according to frequency response characteristics of the turntable actuator at the one or more predetermined speeds. Accordingly, the eccentricity of the turntable actuator can be effectively compensated, thereby improving a lead-in performance, a tracking performance, and a high-speed seeking performance of the disk drive servo system with respect to the disk eccentricity.

25 Claims, 6 Drawing Sheets

DISK DRIVE SERVO SYSTEM FOR ECCENTRICITY COMPENSATION AND METHOD THEREOF

CROSS-REFERENCE TO RELATED APPLICATIONS

This application claims the benefit of Korean Application No. 2001-35106, filed Jun. 20, 2001, in the Korean Intellectual Property Office, the disclosure of which is incorporated herein by reference.

BACKGROUND OF THE INVENTION

1. Field of the Invention

The present invention relates to a disk drive servo system for compensating for eccentricity of a disk in a disk drive, and more particularly, to a disk drive servo system for eccentricity compensation using a compensation table including compensation control values which correspond to rotational speeds of a disk drive and are obtained through repeated control learning processes and frequency response characteristics of a disk drive turntable actuator, and a method of compensating for a disk drive eccentricity.

2. Description of the Related Art

FIG. 1 shows an example of a tracking error signal due to eccentricity in an optical disk drive servo system. The eccentricity in the optical disk drive servo system occurs when a rotational axis of a spindle of a disk drive rotating a disk deviates from a track center of the disk. Since the eccentricity is a main periodic disturbance component and may occur in every period 1T of the spindle, as the rotational speed of the disk drive increases, the influence of the eccentricity on a tracking error signal TES also increases. If the eccentricity is not compensated, an accurate tracking operation cannot be performed. Accordingly, a conventional system has employed various methods of compensating for the eccentricity.

FIG. 2 is a block diagram of a pickup head (PUH) position control system of a general optical recording and reproducing apparatus. The PUH position control system receives a nominal position signal indicating a desirable position of a PUH as an input signal. A feedback signal indicating an actual position of an actuator 220 moving the PUH in an optical disk drive and representing a change of a desired position is fed back to an adder 200 where it is added to the nominal position signal. An error signal "e" output from the adder 200 is input to a controller 210. The controller 210 performs a predetermined algorithm of compensating for the error signal "e" and applies a compensated control output signal to the actuator 220. The actuator 220 moves the PUH in response to the compensated control output signal received from the controller 210. Such operations are repeated to adjust the position of the PUH; however, a large eccentricity cannot be overcome with such a conventional control system.

FIG. 3 shows an example of another conventional technique in which a procedure of performing eccentricity compensation is added to the control system shown in FIG. 2. In the system of FIG. 3, it is assumed that an eccentricity signal is of periodic nature and has a sinusoidal form, $A\sin(\omega t+\phi)$, of amplitude A, a disc rotational frequency $\omega$ and phase $\phi$. A method of compensating for the eccentricity is disclosed in U.S. Pat. No. 5,892,742. In the operation of the system of FIG. 3, before the tracking control starts, a feedforward control value 300 is calculated from an error waveform (TES) as shown in FIG. 1. In other words, an amplitude of the eccentricity is determined using the number of track errors occurring during one track rotation period as shown in FIG. 1, and a phase of the eccentricity is determined based on a delay time between an actuator drive spindle index reference signal indicating one rotation and a track error having a maximum amplitude. The calculated feedforward control value 300 is added to the output of the controller 210. This eccentricity compensation method is simply embodied and easily applied to the control system. However, since this method is a sort of an open loop method which does not consider response characteristics of a servo (actuator) control system, and since the periodic eccentricity does not fully approximate to a complete sine wave, a performance of the control system is limited.

FIG. 4 shows another example of a conventional technique in which another procedure of performing the eccentricity compensation is added to the control system shown in FIG. 2. A control system of FIG. 4 is disclosed in U.S. Pat. No. 5,550,685 and is applied to a hard disk drive system. In this control system, before a control process starts, a fixed feedforward control value is obtained using a track error signal and is then stored in a table 400, and during the control process, an error due to the eccentricity is compensated using the stored feedforward control value.

In addition, considering changes in the Repeatable RunOut (RRO) characteristics occurring due to external factors during an operation of the disk drive system, an adaptive feedforward controller 410 is additionally provided. For this, a discrete Fourier transform (DFT) is performed to extract a particular frequency component from a position error signal (PES or tracking error signal TES) "e", and then an inverse DFT (IDFT) is performed to obtain a correction signal of the particular frequency component. The correction signal of the particular frequency component is added to the PES "e", and the result of this addition of the correction signal and the PES "e" is added to an error input of an existing servo control loop. Through these operations, an error compensation control process can be performed. The control system of FIG. 4 is embodied considering the response characteristics of an entire closed-loop. Although it is more complex than the previous one, it is more effective. However, the control system of FIG. 4 does not consider eccentricity components at various frequencies but at a particular frequency only. In addition, the control system of FIG. 4 cannot adapt itself to a change in the rotational speed of the disk drive.

While the amplitude of the eccentricity remains constant, the frequency component of the eccentricity varies with a playback speed of the disk drive. Since the playback speed of the disk drive changes according to the frequency response characteristics of the actuator of the disk drive, the eccentricity has different influences on the control system, so it is required to change a control value for eccentricity compensation depending on the playback speed of the disk. Particularly, in a case that the eccentricity has a large influence on the control system, the eccentricity can be compensated when the playback speed of the disk drive is low, but the reliability of the system decreases as the playback speed of the disk increases. Since an increase in the rotational speed of a disk drive system requires an increase in the playback speed of the disk, effective eccentricity compensation is strongly needed. In a case of a high eccentricity-bearing disk, as the playback speed of the disk drive servo system increases, the influence of the eccentricity also increases, and the eccentricity prevents a uniform lead-in operation during the tracking control. To overcome this problem, a maximum limit is set for the playback speed according to the amplitude of the eccentricity in the typical disk drive servo system.

Accordingly, to solve the above problems, it is necessary to determine a control value considering various driving frequencies as well as eccentricity values in order to efficiently compensate for the disk eccentricity. Consequently, a new eccentricity compensation method and apparatus which can effectively adapt themselves to a high rotational speed are desired.

SUMMARY OF THE INVENTION

To solve the above and other problems, it is an object of the present invention to provide a disk drive servo system which first obtains control input information for eccentricity compensation through repeated learning control processes at a low speed when the influence of eccentricity is less, changes a control input value by performing a compensation on gain and phase response characteristics of a disk drive turntable actuator at a high speed based on the obtained control input information, and then performs the repeated learning control processes with the changed control input value as an initial value at low speed, thereby improving a lead-in performance, a tracking performance, and a high-speed seeking performance of the disk drive servo system at a high speed with respect to a disk eccentricity, and a method thereof.

Additional objects and advantageous of the invention will be set forth in part in the description which follows and, in part, will be obvious from the description, or may be learned by practice of the invention.

To achieve the above and other objects, according to an embodiment of the present invention, there is provided a disk drive servo system for eccentricity compensation. The disk drive servo system includes an error detector detecting a position error between an actual position and a predetermined nominal reference position of a turntable actuator, a feedback unit generating and outputting a first control value to compensate for the position error received from the error detector, a learning controller calculating, storing, and outputting a second control value to compensate for eccentricity at one or more predetermined speeds of the disk drive, and a gain/phase adjustor providing gain and phase compensation information for the second control value of the learning controller according to frequency response characteristics of the turntable actuator at the one or more predetermined speeds.

According to an aspect of the present invention, the learning controller includes a memory unit storing second control values per track rotation period to compensate for eccentricity at all of the one or more predetermined speeds, a first filter filtering the position error received from the error detector, and a second filter filtering each of the second control values from the memory unit. The second control values at the basic speed are determined through a learning control process in which a value obtained by summing a first output of the first filter and a second output of the second filter is continuously updated until the value reaches a certain value.

According to another aspect of the present invention, control characteristic coefficients of the first and second filters are set such that the second control value reaches the certain value as the number of updating iterations increases.

According to still another aspect of the present invention, the memory unit stores as many second control values for the basic speed per track rotation period as a predetermined number of samples and stores as many second control values for an n-fold basic speed per track rotation period as a predetermined number of samples corresponding to the n-fold basic speed.

According to yet another aspect of the present invention, the second control values for the n-fold basic speed are obtained by multiplying the second control values that are determined for the basic speed through the learning control by "n".

According to still yet another aspect of the present invention, the second control values for the n-fold basic speed are updated using gain and phase compensation values from the gain/phase adjustor.

According to also another aspect of the present invention, the second control values for the n-fold basic speed are updated through the learning control process.

To achieve the above and other objects, according to another embodiment of the present invention, there is provided a method of compensating for the eccentricity of the disk drive servo system. The method includes calculating feedforward control values for the eccentricity compensation with respect to a basic speed, i.e., a pause speed, calculating feedforward control values for the eccentricity compensation with respect to an n×pause speed using the feedforward control values calculated with respect to the pause speed, updating the feedforward control values for the n×pause speed based on gain and phase compensation values according to frequency response characteristics of a turntable actuator of the disk drive servo system at the n×pause speed, and providing the updated feedforward control values for the n×pause speed as input control values to the turntable actuator when the turntable actuator is driven at the n×pause speed.

According to another aspect of the present invention, the feedforward control values corresponding to the basic speed are determined through the learning control process in which a position error of the turntable actuator and a previous feedforward control value are filtered, the results of filtering are summed, and the result of summation is repeatedly updated through filtering and summation until it reaches a certain value.

According to another aspect of the present invention, the eccentricity compensation feedforward control values corresponding to the n×pause speed are determined by picking up (reading) each one of the feedforward control values corresponding to the pause speed at "n" intervals, performing compensation on the feedforward control values based on the gain and phase compensation values according to the frequency response characteristics of the turntable actuator, and performing the learning control process using the compensated feedforward control values as initial values, the learning control process in which a position error of the actuator and a previous feedforward control value are filtered, the results of filtering are summed, and the result of summation is repeatedly updated through filtering and summation until it reaches a certain value.

To achieve the above and other objects, according to another embodiment of the present invention, there is also provided a method of compensating for the eccentricity of the disk drive servo system. The method includes calculating feedforward control values to compensate for the eccentricity with respect to a basic speed, i.e., a pause speed, through a learning control process in which a position error of a turntable actuator and a previous feedforward control value are filtered, the results of filtering are summed, and the result of summation is repeatedly updated through filtering and summation until it reaches a certain value, calculating feedforward control values for compensating eccentricity with respect to an n×pause speed using the feedforward control values calculated with respect to the pause speed, updating the feedforward control values corresponding to the n×pause speed with gain and phase compensated feedforward control values by reflecting gain and phase compensation values according to frequency response characteristics of the turntable actuator of the disk drive servo system at the n×pause speed, updating the gain and phase compensated feedforward control values corresponding to the n×pause speed with eccentricity compensation feedforward values by performing the learning control process, and providing the eccentricity compensation feedforward control values corresponding to the n×pause speed as input control values to the turntable actuator when the turntable actuator is driven at the n×pause speed.

BRIEF DESCRIPTION OF THE DRAWINGS

These and other objects and advantageous of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
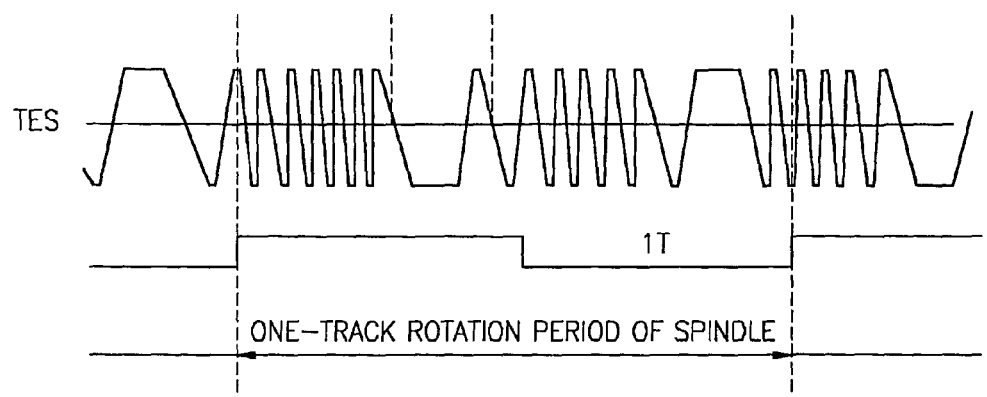
FIG. 1 is a diagram showing an example of a tracking error signal occurring due to eccentricity in an optical disk drive servo system.
Figure 2:
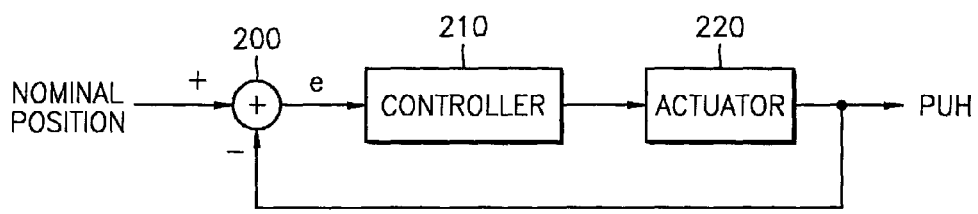
FIG. 2 is a block diagram of a pickup head (PUH) position control system of a general optical recording and reproducing apparatus.
Figure 3:
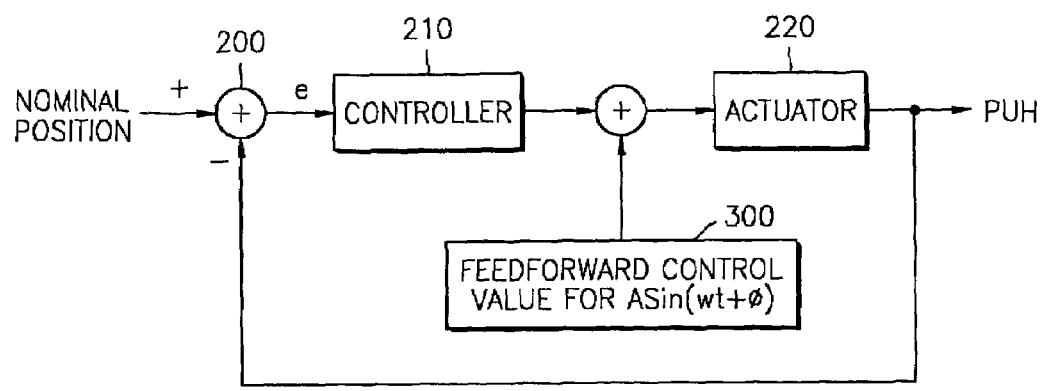
FIG. 3 is a diagram showing an example of a conventional technique in which a procedure of performing eccentricity compensation is added to the control system shown in FIG. 2.
Figure 4:
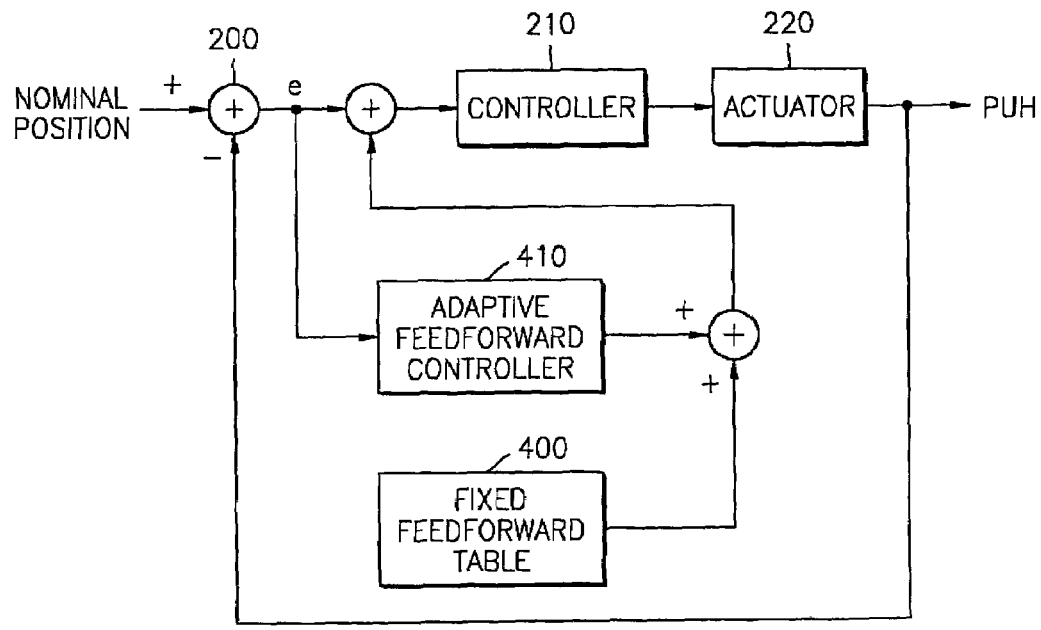
FIG. 4 is a diagram showing another example of the conventional technique in which another procedure of performing the eccentricity compensation is added to the control system shown in FIG. 2.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Hereinafter, embodiments of the present invention will be described in detail with reference to the attached drawings.

Figure 5:
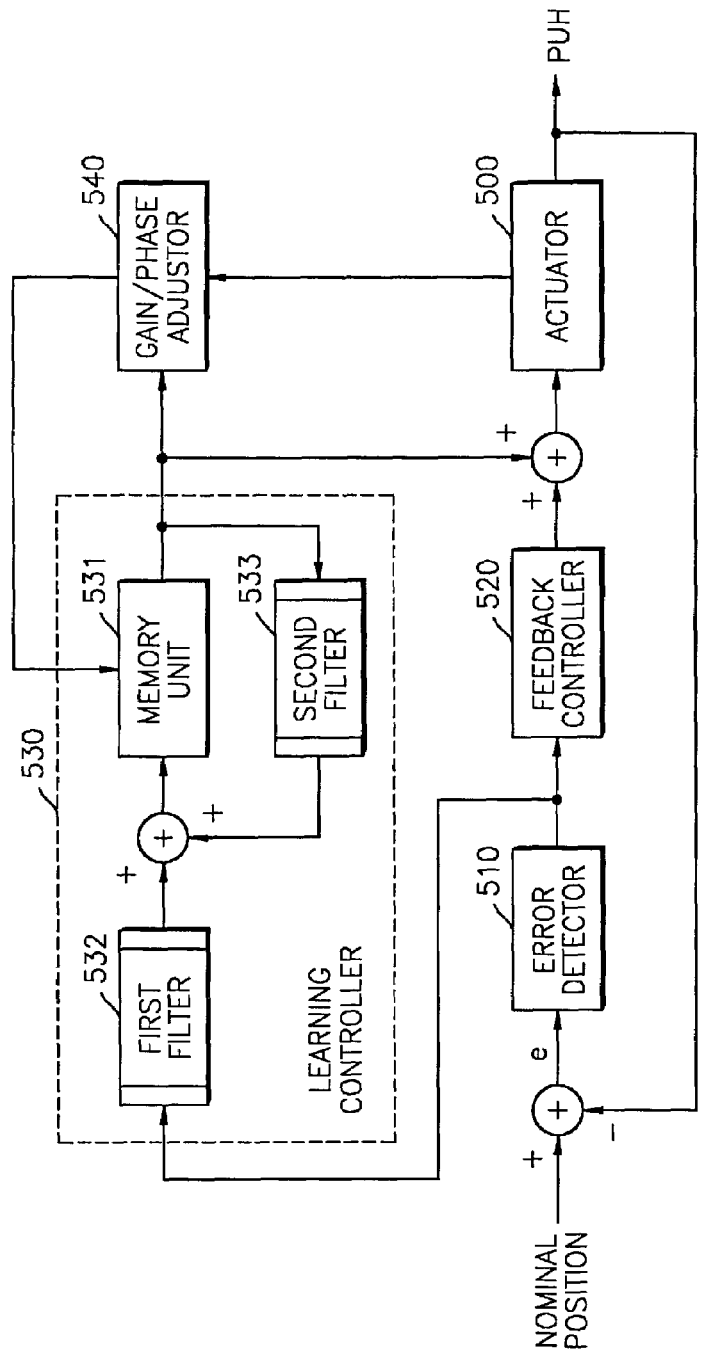
FIG. 5 is a block diagram of a disk drive servo system according to an embodiment of the present invention.

FIG. 5 is a block diagram of a disk drive servo system for eccentricity compensating according to an embodiment of the present invention. The disk drive servo system includes a turntable (disk drive) actuator 500, an error detector 510, a feedback controller 520, a learning controller 530, and a gain/phase adjustor 540.

The turntable actuator 500 determines a position of a head, such as a pickup head (PUH), recording data on an optical recording medium (disk) or reproducing the data therefrom.

The error detector 510 detects a difference (a position error) between a nominal reference position and an actual position of the PUH.

The feedback controller 520 receives a position error output value from the error detector 510 and generates an actuator driving control value to change the actual position of the PUH to compensate for the position error.

The learning controller 530 generates and stores feedforward control values to compensate for position errors of the turntable actuator 500 due to eccentricity at predetermined rotational speeds during an operation of the disk drive servo system. The learning controller 530 includes a memory unit 531, a first filter 532, and a second filter 533. The memory unit 531 stores the feedforward control values to compensate for the position errors of the turntable actuator 500 due to the eccentricity at the predetermined rotational speeds at which the disk is driven. The first filter 532 filters the position error output value received from the error detector 510 according to first predetermined characteristics. The second filter 533 filters the feedforward control values stored in the memory unit 531 according to second predetermined characteristics. A first value output from the first filter 532 and a second value output from the second filter 533 are added, and a result value of summation replaces the particular feedforward control value stored in the memory unit 531 corresponding to the rotational speed.

The above operations of the learning controller 530 are repeated until the feedforward control value stored in the memory unit 531 corresponding to the rotational speed reaches a certain value. If it is assumed that a learning control process with respect to a single track rotation period of the disk is defined as a single control cycle, when the feedforward control value obtained from a k-th control cycle is $u_k(t)$ and the current tracking error is $e_k(t)$, the feedforward control value $u_{k+1}(t)$ obtained from the (k+1)-th control cycle is obtained as presented in Formula (1).

$$U_{k+1}(s) = P(s)U_k(s) + Q(s)E_k(s) \qquad (1)$$

Here, $U_k(s)$, $U_{k+1}(s)$, and $E_k(s)$ are obtained by Laplace transformation of $u_k(t)$, $u_{k+1}(t)$, and $e_k(t)$, respectively, and $P(s)$ and $Q(s)$ indicate control characteristic coefficients of the respective first and second filters 532 and 533 which process $U_k(s)$ and $E_k(s)$, respectively.

The operation, as shown in Formula (1), of repeatedly summing a previous control value and the result value ( another position error) of compensating for the position error according to the previous control value and continuously updating the result value of the summation to determine an optimal control value can be referred to as the learning control process. The control characteristic coefficients of the respective first and second filters 532 and 533 are set such that the result value of the learning control process can approach and reach a certain value as the number of repetitions of the summation increases during the learning control process. The learning controller 530 calculates the feedforward control value for the eccentricity compensation at a basic (low) speed (or a pause speed) with respect to the single track rotational period through the learning control process and stores the feedforward control value.

A new feedforward control value at a high speed is calculated from the feedforward control value at the low speed. The calculated feedforward control value is updated according to gain and phase compensation values provided from the gain/phase adjustor 540, and the result value of the updated feedforward control value is used as an initial control value during another learning control process, thereby generating a final (feedforward) control value reaching the certain value. The memory unit 531 of the learning controller 530 stores the feedforward control values at the different low and high speeds in the form of a table and provides the stored feedforward control value as the initial or final control values with respect to the eccentricity compensation at the different speeds when the turntable actuator 500 is driven.

The gain/phase adjustor 540 provides the gain and phase compensation values according to the frequency response characteristics of the turntable actuator 500 at the speeds. The gain and phase compensation values provided from the gain/phase adjustor 540 are then used for updating the feedforward control values for the predetermined speeds in the memory unit 531, and the updated feedforward control values are used as the initial values for the learning control process. The feedforward control values stored in the memory unit 531 after being updated by the gain/phase compensation values become the control values which can effectively and reliably reduce the influence of the eccentricity through the learning control process.

Figure 6A:
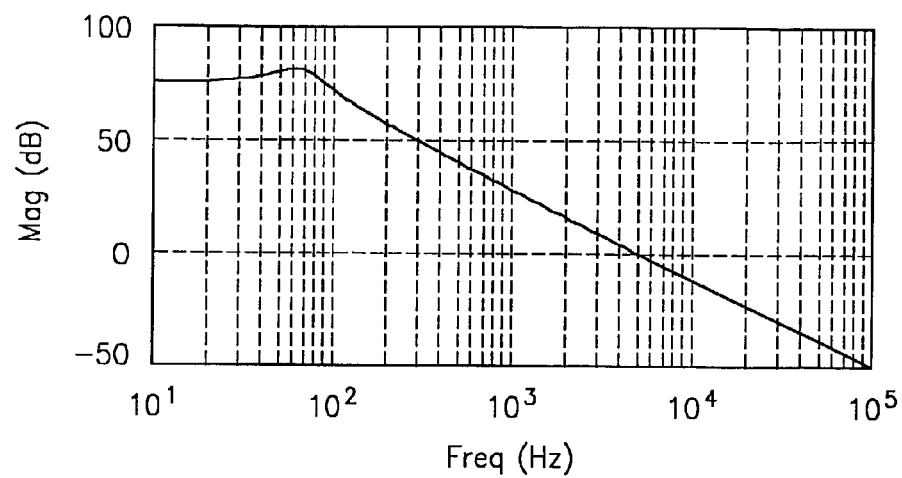
FIGS. 6A and 6B are graphs of examples of gain response characteristic and phase response characteristic, respectively, of a disk drive turntable actuator of the disk drive servo system of FIG. 5.
Figure 6B:
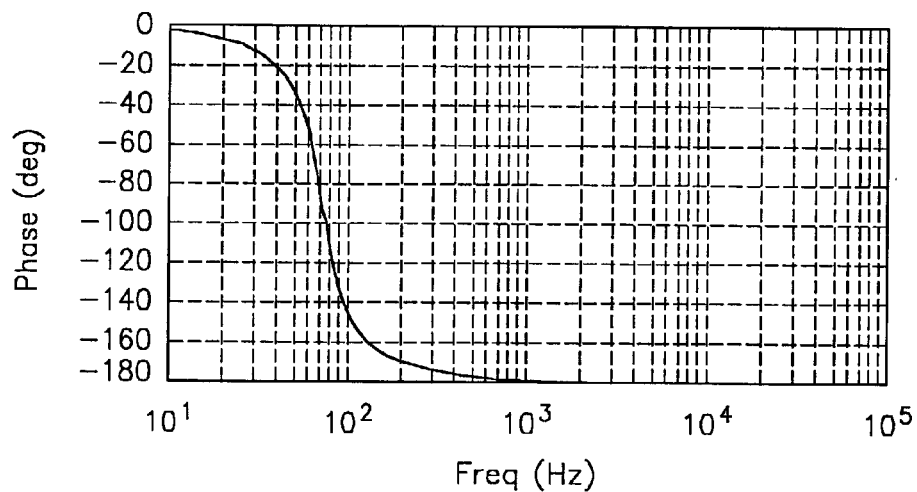

FIGS. 6A and 6B are graphs of examples of the gain response characteristic and phase response characteristic, respectively, of the turntable actuator 500. After a frequency exceeds a predetermined value, a gain of the turntable actuator 500 gradually decreases while a phase difference increases. Such response characteristic information with respect to the gain and the phase difference of the turntable actuator 500 of FIG. 5 is stored in the gain/phase adjustor 540, and the gain/phase adjustor 540 provides the gain and phase compensation values based on the response characteristic information corresponding to the speeds and different frequencies, respectively.

Figure 7A:
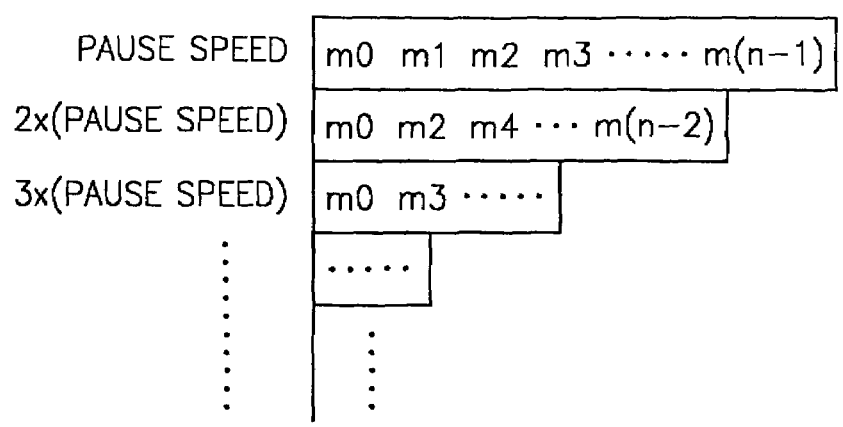
FIGS. 7A and 7B are diagrams of examples of a first table storing initial control values and a second table storing updated control values obtained after a gain and phase compensation process in a memory unit of the learning controller in the disk drive servo system of FIG. 5.
Figure 7B:
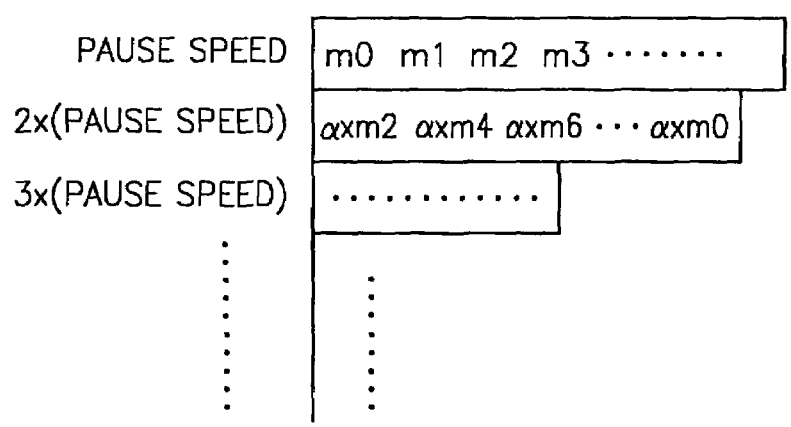

FIGS. 7A and 7B are diagrams of examples of a first table storing initial control values and a second table storing the control values obtained from the gain and phase compensation values in the memory unit 531 of the learning controller 530. FIG. 7A shows the first table storing the initial control values corresponding to the basic speed, a double basic speed, and a triple basic speed. Here, as many initial control values as the number of sampling of the position errors occurring during the single disk track rotation period particularly due to the eccentricity are generated for each basic speed.

When the initial control values for suppressing the position errors due to the eccentricity at the basic speed are m0, m1, m2, . . . , m(n−1) (where "n" is a natural number representing the number of samples during the one disk track rotation period), the initial control values for the double basic speed are obtained like m0, m2, m4, . . . , m(n−2) from the initial control values for the basic speed. In other words, for the double basic speed, 2i initial control values (where i=0 through (n−1)) are picked up from the initial control values as a basic speed factor. For the initial control values for the triple basic speed, 3i initial control values are picked up from the initial control values as the basic speed factor.

The table shown in FIG. 7B stores the control values changed from the control values shown in FIG. 7A by using the gain and phase compensation values provided from the gain/phase adjustor 540 of FIG. 5 corresponding to the respective speeds. For example, in a case of the double basic speed, if a gain compensation value $\alpha$ and a phase compensation value $\beta$ ($360 \times 2/n$) corresponding to the double basic speed are provided from the gain/phase adjustor 540, the initial control values m0, m1, m2, . . . , m(n−2) for the double basic speed are converted into $\alpha \times m2$, $\alpha \times m4$, . . . , $\alpha \times m0$. In the same manner, the initial control values as other speeds factors are converted into new control values by applying the gain and phase compensation values provided from the gain/phase adjustor 540 to the stored feedforward control values. The control values in the second table shown in FIG. 7B are used as the initial values during the learning control process at the different speeds, and the final control values determined through the learning control process are used for controlling the turntable actuator 500.

Figure 8:
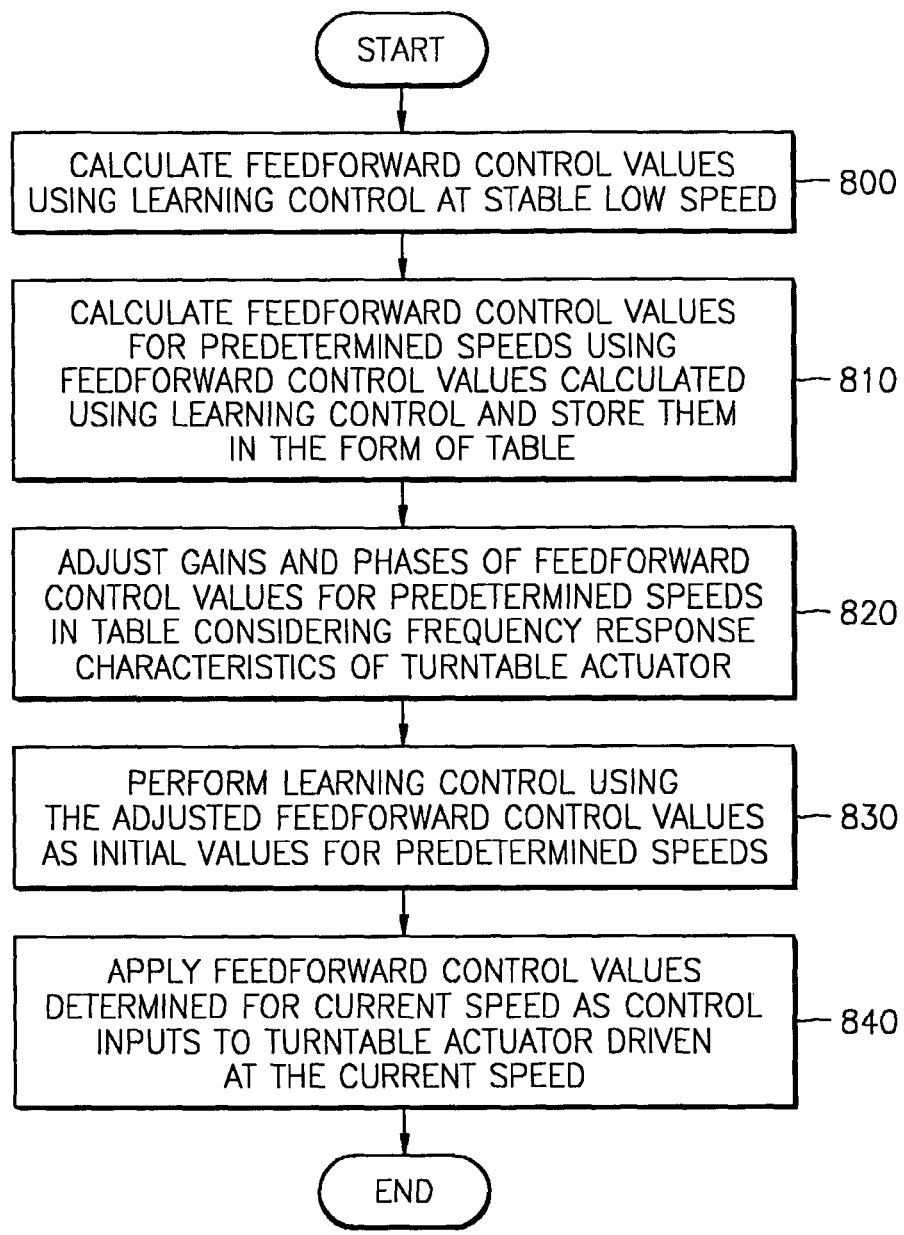
FIG. 8 is a flowchart of a method of compensating for the eccentricity of the disk drive servo system according to another embodiment of the present invention.

FIG. 8 is a flowchart of a method of compensating for the eccentricity of the disk drive servo system according to another embodiment of the present invention. After the disk is loaded, optimal feedforward control values to compensate for the eccentricity of the disk drive servo system are calculated using the learning control process at the fixed basic (stable low) speed (a pause speed) in operation 800. If it is assumed that the learning control process with respect to the single track rotation period of the disk is defined as the single control cycle, when a control value obtained from the k-th control cycle is $u_k(t)$ and a current tracking error is $e_k(t)$, a control value $u_{k+1}(t)$ obtained from the (k+1)-th control cycle can be obtained according to Formula (1). In Formula (1), $U_k(s)$, $U_{k+1}(s)$, and $E_k(s)$ are obtained by Laplace transformation of $u_k(t)$, $u_{k+1}(t)$, and $e_k(t)$, respectively, and $P(s)$ and $Q(s)$ indicate the control characteristic coefficients of the filters 532, 533 processing $U_k(s)$ and $E_k(s)$, respectively.

An operation according to Formula (1) of repeatedly summing a previous control value and the result value (another position error) of compensating for the position error according to the previous control value and continuously updating the result value of the summation of the previous control value and the previous result value to determine the optimal control value can be referred to as the learning control process. The control characteristic coefficients must be set such that the result value of the summation can approach and reach the certain value as the number of repetitions of the summation increases during the learning control process. As many control values as the number of samples of the position errors are obtained during the single track rotation period at the pause speed and stored in the form of the table. Another table of other feedforward control values corresponding to respective speeds are formed based on the table of the feedforward control values corresponding to the pause speed in operation 810.

For example, for the feedforward control values for a double pause speed, the feedforward control values located at the 2i-th sampling position (where i=0, . . . , n) are picked up from the feedforward control values obtained for the pause speed in operation 810. After the table of the feedforward control values for the speeds are formed, the gains and phases of the feedforward control values for the speeds in the table are adjusted according to the response characteristic information having the gain and phase response characteristics corresponding to the speeds (or the frequencies) in operation 820. The turntable actuator 500 to be controlled according to the present invention is characterized by having response characteristics deteriorating as the speeds are over a predetermined basic speed (or a predetermined frequency) and increases. Since the feedforward control values for the disk drive actuator with respect to the different speeds are obtained using the feedforward control values corresponding to the basic speed (pause speed) without considering the frequency response characteristics of the turntable actuator 500 in operation 810, it is necessary to perform additional gain and phase adjustment on the feedforward control values depending on the frequency response characteristics of the turntable actuator 500.

After the gain and phase adjustment is performed on the feedforward control values corresponding to the speeds considering the frequency response characteristics of the turntable actuator 500, the learning control process is performed with respect to all predetermined speeds other than the pause speed by using the gain and phase adjusted feedforward control values corresponding to the predetermined speeds as the initial values so as to calculate the final control values in operation 830. Here, the learning control process is performed in the same manner as in operation 800. This learning control process is performed in order to allow the disk drive servo system to effectively adjust differences in the frequency response characteristics of the turntable actuator 500. In operation 840, eccentricity compensation feedforward control values obtained from the learning control process with respect to a given speed factor in operation 830 are provided as the initial control values when the turntable actuator 500 is driven at the given speed factor, thereby compensating for the eccentricity of the disk drive servo system.

According to the present invention, eccentricity of a disk drive servo system is detected at a low speed at which influence of the eccentricity on a turntable actuator of the disk drive servo system is relatively small and a control of the turntable actuator can be well-performed with only an open-loop controller, and then feedforward control values are calculated through a learning control process. For control values at a high speed, as many control values as the number of samples corresponding to a track rotation period of the high speed are calculated from the control values calculated at the low speed according to a predetermined scheme. Compensation is performed on the calculated control values for the high speed, considering frequency response characteristics of the turntable actuator at the high speed.

Next, the learning control process is performed using the compensated control values at the high speed as initial values in the same manner as at the low speed so that differences in the frequency response characteristics of the turntable actuator can be compensated. Therefore, the present invention can improve a lead-in performance, a tracking performance, and a high-speed seeking performance of the disk drive servo system at a high speed with respect to the eccentricity of the disk.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A disk drive servo system for eccentricity compensation of a turntable actuator, comprising:
   an error detector detecting a position error between an actual position and a predetermined nominal reference position of the turntable actuator;
   a feedback unit generating and outputting a first control value to compensate for the position error received from the error detector;
   a learning controller calculating, storing, and outputting a second control value to compensate for the eccentricity at one or more predetermined speeds of the turntable actuator; and
   a gain/phase adjustor providing gain and phase compensation information corresponding to the second control value of the learning controller according to frequency response characteristics of the turntable actuator at the one or more predetermined speeds.

2. The disk drive servo system of claim 1, wherein the learning controller comprises:
   a memory unit storing the second control value per track rotation period to compensate for the eccentricity at all of the one or more predetermined speeds;
   a first filter filtering the position error received from the error detector; and
   a second filter filtering the second control value from the memory unit, wherein the second control value corresponding to a basic speed is determined through a learning control process in which a value obtained by summing a first output of the first filter and a second output of the second filter is continuously updated until the value reaches a certain value.

3. The disk drive servo system of claim 2, wherein control characteristic coefficients of the first and second filters are set such that the second control value reaches the certain value as the number of updating of the value increases.

4. The disk drive servo system of claim 2, wherein the second control value comprises a plurality of second control values, and the memory unit stores as many second control values corresponding to the basic speed per track rotation period as a predetermined number of samples of the position error and stores as many second control values corresponding to an n-fold basic speed per track rotation period as a predetermined number of samples of the position error corresponding to the n-fold basic speed.

5. The disk drive servo system of claim 4, wherein the second control values corresponding to the n-fold basic speed are obtained by multiplying the second control values corresponding to the basic speed by "n".

6. The disk drive servo system of claim 5, wherein the second control values corresponding to the n-fold basic speed are updated using gain and phase compensation values generated from the gain/phase adjustor.

7. The disk drive servo system of claim 6, wherein the second control values corresponding to the n-fold basic speed are updated through the learning control.

8. A method of compensating for eccentricity of a disk drive servo system having a turntable actuator, the method comprising:
   calculating first feedforward control values for eccentricity compensation with respect to a basic speed;
   calculating second feedforward control values for the eccentricity compensation with respect to an n×pause speed using the first feedforward control values calculated with respect to the basic speed;
   updating the second feedforward control values corresponding to the n×pause speed based on gain and phase compensation values according to frequency response characteristics of the turntable actuator of the disk drive servo system at the n×pause speed; and
   providing the updated feedforward control values corresponding to the n×pause speed as input control values to the turntable actuator when the actuator is driven at the n×pause speed.

9. The method of claim 8, wherein the first feedforward control values corresponding to the basic speed are determined through a learning control process in which filtering of a position error of the turntable actuator and a previous feedforward control value, summing of the filtered position error and the filtered previous feedforward control value, and updating of one the first feedforward control values with the summation of the filtered position error and the filtered previous feedforward control value are repeated until the one of the updated first feedforward control values reaches a certain value.

10. The method of claim 8, wherein the updating of the second feedforward control values corresponding to the n×pause speed comprises:
   reading each one of the feedforward control values corresponding to the pause speed at predetermined intervals;
   performing compensation on the second feedforward control values based on the gain and phase compensation values according to the frequency response characteristics of the turntable actuator; and
   performing the learning control process using the compensated feedforward control values as initial values, the learning control process in which filtering of a position error of the turntable actuator and a previous feedforward control value, summing of the filtered position error of the actuator and the filtered previous feedforward control value, and updating of one of the second feedforward control values with the summation of the filtered position error of the actuator and the filtered previous feedforward control values are repeated until the one of the updated second feedforward control values reaches a certain value.

11. A method of compensating for eccentricity of a disk drive servo system having a turntable actuator, the method comprising:
   calculating a first feedforward control value to compensate for the eccentricity with respect to a basic speed through a learning control process in which filtering of a position error of the turntable actuator and a previous first feedforward control value, summing of the filtered position error of the actuator and the filtered previous feedforward control value, and updating of the first feedforward control value with the summation of the filtered position error of the actuator and the filtered previous feedforward control value are repeated until the updated first feedforward control value reaches a certain value;
   calculating second feedforward control value to compensate for the eccentricity with respect to an n×pause speed using the first feedforward control values calculated with respect to the pause speed;
   updating the second feedforward control value corresponding to the n×pause speed with a gain and phase compensated feedforward control value according to frequency response characteristics of the turntable actuator of the disk drive servo system at the n×pause speed;
   updating the gain and phase compensated feedforward control value corresponding to the n×pause speed with an eccentricity compensated feedforward control value obtained by performing the learning control process; and
   providing the eccentricity compensated feedforward control value corresponding to the n×pause speed as an input control value to the turntable actuator when the turntable actuator is driven at the n×pause speed.

12. The method of claim 11, wherein the second feedforward control value corresponding to the n×pause speed is obtained by reading and processing the first feedforward control value corresponding to the basic speed through the learning control process at predetermined intervals.

13. A method in a disk drive servo system having a turntable actuator driving a disk, comprising:
   detecting a position error signal representing a position error between an actual position and a predetermined nominal reference position of the turntable actuator with respect to a track of the disk;
   generating and outputting a first control value to compensate for the position error when the turntable actuator drives the disk at a first speed;
   calculating a second control value to compensate for eccentricity of the disk with respect to the turntable actuator when the turntable actuator drives the disk at a second speed higher than the first speed in accordance with the first control value;
   generating compensation information of the turntable actuator in response to the second control value; and
   calculating a third control value to compensate for the eccentricity in accordance with the second control value and the compensation information.

14. The method of claim 13, wherein the detecting of the position error signal comprises:
   receiving a nominal position signal; and
   generating the position error signal in response to both the nominal position signal and one of the first, second, and third control values.

15. The method of claim 14, wherein the detecting of the position error signal further comprises:
   controlling the turntable actuator in response to the position error signal and one of the first, second, and third control values.

16. The method of claim 13, wherein the calculating of the second control value comprises:
   calculating the second control value using a Laplace transformation based on the first control value and the position error signal.

17. The method of claim 13, wherein the calculating of the second control value comprises:
   generating a first filter signal in response to the position error signal;
   generating a second filter signal in response to the first control value; and
   adding the first filter signal and the second filter signal to generate the second control value.

18. The method of claim 17, wherein the disk drive servo system comprises a first filter, and the generating of the first filter signal comprises:
   filtering the position error signal with a first characteristic of the first filter to generate the first filter signal.

19. The method of claim 18, wherein the filtering of the position error signal comprises:
   calculating the first filter signal using a Laplace transformation based on the first characteristic of the first filter and the position error signal.

20. The method of claim 18, wherein the disk drive servo system further comprises a second filter, and the generating of the first filter signal comprises:
   filtering the first control value with a second characteristic of the second filter to generate the second filter signal.

21. The method of claim 20, wherein the filtering of the first control value comprises:
    calculating the second filter signal using a Laplace transformation based on the second characteristic of the second filter and the first control value.

22. The method of claim 17, wherein the generating of the second control value comprises:
    updating the first control value with the second control value until the second control value is a reference value.

23. The method of claim 13, wherein the calculating of the third control value comprises:
    updating the second control value with the third control value to compensate for the eccentricity of the disk with respect to the turntable actuator.

24. The method of claim 13, wherein the generating of the compensation information comprises:
    controlling the turntable actuator in response to the second control value; and
    generating the compensation information according to a frequency response characteristic of the turntable actuator.

25. The method of claim 13, wherein the compensation information comprises gain or phase information of the turntable actuator in response to the second control value.

* * * * *